(12) United States Patent
Reihl

(10) Patent No.: US 7,469,111 B2
(45) Date of Patent: Dec. 23, 2008

(54) PRINTER OR COPIER WITH A REFRIGERATOR FOR GENERATION OF COLD

(75) Inventor: Heiner Reihl, Freising (DE)

(73) Assignee: Oce Printing Systems GmbH, Poing (DE)

( * ) Notice: Subject to any disclaimer, the term of this patent is extended or adjusted under 35 U.S.C. 154(b) by 302 days.

(21) Appl. No.: 11/398,913

(22) Filed: Apr. 6, 2006

(65) Prior Publication Data
US 2006/0228128 A1    Oct. 12, 2006

(30) Foreign Application Priority Data
Apr. 8, 2005   (DE)   ..................   10 2005 016 296

(51) Int. Cl.
*G03G 21/20*   (2006.01)
(52) U.S. Cl. ........................................... 399/91; 399/92
(58) Field of Classification Search .................... 399/91, 399/92, 93, 94, 97, 98
See application file for complete search history.

(56) References Cited

U.S. PATENT DOCUMENTS 4,733,272 A    3/1988   Howe et al.
5,481,339 A *  1/1996   De Cock et al. ............... 399/93
6,771,916 B2 * 8/2004   Hoffman et al. .............. 399/92
2004/0126160 A1  7/2004   Keidel et al.

FOREIGN PATENT DOCUMENTS

| DE | 28 11 835  | 9/1979 |
| DE | 102 27 575 | 1/2004 |
| EP | 1 361 485  | 11/2003 |
| JP | 58 83875   | 5/1983 |
| JP | 63 184774  | 7/1988 |
| JP | 11 338333  | 12/1999 |

OTHER PUBLICATIONS

Grundlagen der Kältetechnik Verlag Technik GmbH Berlin Jungnickel et al.

* cited by examiner

*Primary Examiner*—Hoan H Tran
(74) *Attorney, Agent, or Firm*—Schiff Hardin LLP

(57) ABSTRACT

In a printer or copier at least one printing unit is provided that generates at least one toner image on at least one page of a carrier material. The printer or copier also has at least one fixing unit that fixes the toner image on the carrier material with aid of a heat generated by the fixing unit. The printer or copier also has a refrigerator to which is supplied at least a part of the heat generated in the fixing unit. The refrigerator uses at least a part of the supplied heat for generation of cold.

27 Claims, 3 Drawing Sheets

PRINTER OR COPIER WITH A REFRIGERATOR FOR GENERATION OF COLD

BACKGROUND

The present preferred embodiment concerns a printer or copier with a refrigerator for generation of cold. The printer or copier comprises at least one printing unit that generates at least one toner image on at least one side of a carrier material. The printer or copier has at least one fixing unit for fixing of the toner image on the carrier material with the aid of the heat generated by the fixing unit. The preferred embodiment also concerns a method for generation of cold with the aid of a printer or copier.

Modern high-capacity printing systems are known in which printing units generate toner images on a carrier material with printing speeds of up to 1.5 m/sec. The toner images generated on the carrier material must subsequently be fixed at the same speed. If the carrier material is printed two-sided, i.e. toner images are generated both on the front side and on the back side of the carrier material (advantageously with the aid of two printing units), both the toner image on the front side and the toner image on the back side of the carrier material must be fixed with the aid of a fixing unit. In typical high-capacity printing systems, radiant heat is used for supply of the necessary fixing energy given a heat fixing, and alternatively heated rollers are used given a heat/pressure fixing. Combinations of these methods for fixing are possible. Dependent on the width of the carrier material and the actual print speed, such fixing units have an emitted heat capacity of 5 kW to 20 kW. If such a high-capacity printer is operated in an operating mode in which single sheets are respectively printed on one side with the aid of two printing groups, whereby the single sheets to be printed in succession are alternately supplied to the first and to the second printing group, and subsequently, successively directed through a fixing unit, these single sheets are supplied to the fixing unit for fixing with double the printing speed. Depending on the width of the carrier material to be printed and on the print speed of the individual printing groups, a fixing heat capacity of >20 kW can also be necessary in such printer or copiers.

Alternatively, flashbulb fixing devices be used. Given flashbulb fixing devices, the necessary fixing energy is fixed both via the light radiation and via the heat energy generated with the generation of the light energy.

On the other hand, the carrier material is to be cooled and humidified after the fixing in order to not excessively strain (i.e. to stress) the paper. Modules for image generation as well as electronic modules in high-capacity printers also typically have to be cooled. Thus, for example, an LED character generator is cooled or kept at a constant temperature so that the LEDs of the character generator have a uniform light power. The photoconductor temperature may also not be exceeded, since otherwise the conductivity of the photoconductor layer increases, whereby the image generation process would be negatively influenced. The temperature in the developer stations may also not exceed an allowable limit value, since otherwise the toner particles too strongly adhere with other toner particles and with carrier particles, whereby the developer capacity is significantly impaired or an image generation is no longer possible.

For example, arrangements for cooling of developer units of an electrophotographic printer or copier are known from the documents DE 102 27 575 A1, JP 58083875 and JP 63184774 A.

The heat quantity generated in the fixing unit is only dissipated in part with the carrier material. The remaining portion is typically conducted out from the fixing unit via an exhaust air channel. The waste heat is subsequently optimally guided out from the room (in which the printer is installed) via a ventilation system. A fixing station for fixing of toner images on a recording medium is known from the document DE 28 11 835 A1, in which heat is withdrawn from the recording medium with the aid of a first heat exchanger device arranged at the output of the fixing station. The first heat exchanger device is, connected with a second heat exchanger device arranged at the input of the fixing station, via which second heat exchanger device heat is supplied to the recording medium.

From the document JP 11-338 333 A it is known to arrange a cooling channel around a fixing unit in order to reduce the heat influence on adjacent modules.

From the document U.S. Pat. No. 4,733,272, an image generation device is known in which the fluid of images generated with fluid is dried, whereby the fluid is absorbed by air flowing past. The air containing the fluid is supplied to a heat exchanger and subsequently to a condenser, whereby the fluid contained in the air is condensed and subsequently separated.

A fixing unit for cold fixing of toner images with the aid of a solvent is known from the document US 2004/0126160 A1.

A heat-pressure fixing unit is known from the document EP 1 361 485 A2.

Various absorption refrigerators, in particular Sterling refrigerators and Viulleumier Vuilleumier refrigerators, are known from the document Jungnickel, H. et al., "Grundlagen der Kältetechnik", Verlag Technik, Berlin, 1990, ISBN 3-341-00806-3.

SUMMARY

It is an object to specify a printer or copier in which cold is generated in a simple manner, whereby the additional energy required for generation of the cold is relatively slight. A method for generation of cold with the aid of a printer or copier is also to be specified.

In a method or system for generation of cold with a printer or copier, at least the part of a heat generated with a fixing unit which fixes at least one toner image on a carrier material is supplied to a refrigerator. Cold is generated by the refrigerator with at least a part of the supplied heat.

DESCRIPTION OF THE PREFERRED EMBODIMENT

Figure 1:
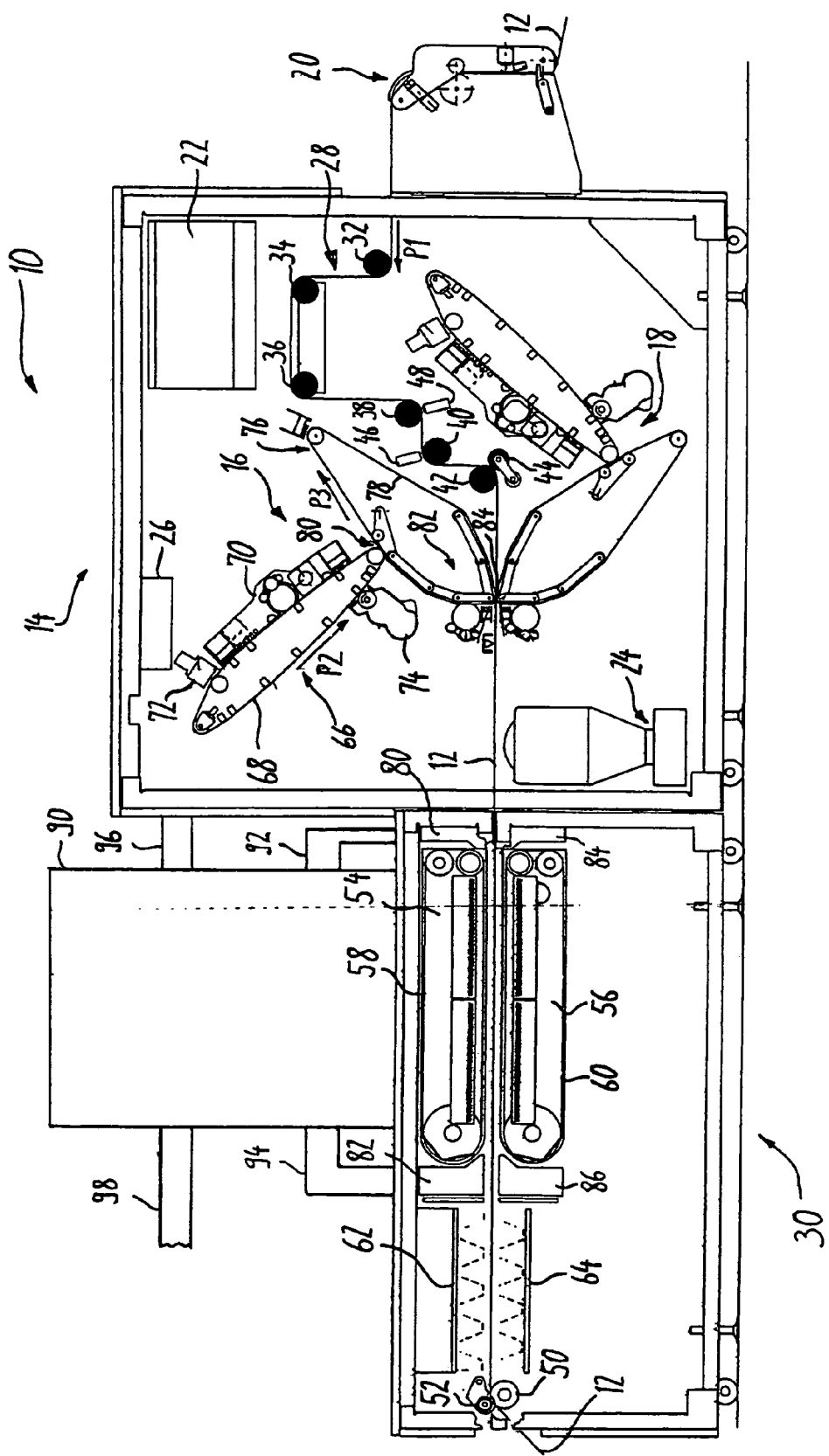
FIG. 1 shows a schematic design of an electrophotographic printer with two printing units.

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur now or in the future to one skilled in the art to which the invention relates.

The printer or copier of the preferred embodiment uses the waste heat of the fixing unit for generation of cooling capacity. The generated cooling capacity is advantageously used in order to cool components of the printer or copier, structural units or modules of the printing groups, electronic modules as well as an after-cooling unit for cooling of the carrier material after the fixing process. If the printer or copier is an electrophotographic printer or copier, in particular components of the electrophotography can be cooled so that these components do not exceed an allowable temperature. The temperature in the region of these components is advantageously regulated with the aid of a temperature regulation, whereby advantageously they are only cooled when a preset desired value is exceeded. No auxiliary energy or only slight auxiliary energy is required for operation of the refrigerator of the printer or copier.

A second aspect of the preferred embodiment concerns a method for generation of cold with the aid of a printer or copier. In this method, at least a part of the heat generated with the aid of a fixing unit for fixing of at least one toner image on a carrier material is supplied to a refrigerator. Cold is also generated by the refrigerator with the aid of at least a part of the supplied heat.

Via such a method of the preferred embodiment, refrigeration capacity can be generated relatively simply and cost-effectively since the waste heat generated by the fixing unit is used for actuation of the refrigerator. No further auxiliary energy or only slight further auxiliary energy is required for operation of the refrigerator.

A third aspect of the preferred embodiment concerns the use of an absorption refrigerator for generation of cold from a waste heat flow of a fixing unit of a printer or copier. Via the use of an absorption refrigerator, a refrigerator with relative simple design is used for generation of refrigeration capacity from the waste heat flown of the fixing unit of the printer or copier, whereby the cold can be generated relatively simply and cost-effectively. Such an absorption refrigerator requires only relatively slight auxiliary energy or no auxiliary energy.

A fourth aspect of the preferred embodiment concerns the use of a diffusion-absorption refrigerator for generation of cold from a waste heat flow from a fixing unit of a printer or copier. Cold can be generated relatively simply and efficiently from the waste heat flow of the fixing unit with the aid of such a diffusion-absorption refrigerator. Only slight auxiliary energy or no auxiliary energy is required for operation of the diffusion-absorption refrigerator.

An electrophotographic high-capacity printer 10 for printing of an endless paper web 12 with a printing speed of approximately 1 m/s is shown in FIG. 1. A printing group 14 comprises a first image generation and transfer printing unit 16 for printing of the front side of the paper web 12 as well as a second image generation and transfer printing unit 18 for printing of the back side of the paper web 12. The image generation and transfer printing units 16, 18 are designated in the following as printing units 16, 18. The printing unit 16 is essentially structurally identical with the printing unit 18. The printing group 14 furthermore contains a paper feed 20, a control unit 22, a toner reservoir and preparation system 24, an image data processing unit 26 as well as a paper web drive and guidance system 28.

The paper web 12 is conveyed through the printing system 10 in the arrow direction of the arrow P1 with the aid of the paper web drive and guidance and monitoring system 28, whereby after the printing in the printing group 14 the paper web 12 is supplied to a fixing station 30 that fixes the toner images generated on the paper web 122 by the printing group 14. The paper web guidance and monitoring system 28 comprises deflection rollers 32 through 40 as well as a drive roller 42 with an oppositely-situated pressure roller 44. Two hole sensors 46, 48 are also provided that monitor the position of margin holes contained in the paper web 12. A further drive roller 50 and pressure roller 52 for paper discharge are provided in the fixing station 30.

The first printing unit 16 and the second printing unit 18 are arranged on surfaces of the paper web 12 facing away from one another. The first printing unit 16 is also designated as an upper printing unit and the second printing unit 18 is also designated as a lower printing unit. With the aid of the drive roller 42, the paper web. 12 can be conveyed both in the arrow direction of the arrow P1 and in the opposite direction, whereby in the following the transport of the paper web 12 in the arrow direction of the arrow P1 is designated with forward movement and the transport of the paper web 12 in the direction opposite that of the arrow P1 is designated with backwards movement. The function of the printing group 14 and of the fixing station 30 is described in detail in WO 00/34831 and DE 198 27 210 C1, which by reference are components of the disclosure of the application.

The first printing unit 16 comprises a first belt drive 66 with a photoconductor belt 68 that is typically also designated as an OPC belt. The photoconductor belt 68 is driven in the arrow direction of the arrow P2 with the aid of the belt drive 66. With the aid of a cleaning and charging unit 70, the photoconductor belt 68 is discharged, toner residues are removed from the photoconductor belt 68 and is charged to a predetermined potential. Regions of the uniformly-charged surface of the photoconductor belt 68 corresponding to the signals supplied from the image data processing unit 26 to the character generator 72 are discharged in part (i.e. per image point, dependent on the electrophotographic principle utilized) to a lower potential or charged in part to a higher potential with the aid of a character generator 72 that is executed as an LED character generator, whereby a charge image is generated on the surface of the photoconductor belt 68. The charge image located on the surface of the photoconductor belt 68 comprises a latent print image. The charge image on the surface of the photoconductor belt 68 is inked with toner into a toner image with the aid of a developer unit 74.

The printing unit 16 furthermore comprises a second belt drive 76 with a transfer belt 78 that is driven in the arrow direction of the arrow P3. The photoconductor belt 68 contacts the transfer belt 78 at a transfer printing location 80, i.e. the surface of the photoconductor belt 68 touches the surface of the transfer belt 78, whereby a toner image located on the photoconductor belt 68 is transferred onto the surface of the transfer belt 78. With the aid of a roller device 82 whose rollers are connected with one another via levers, the transfer belt 78 is directed towards the paper web 12 in a transfer printing region 84 and directed away from this paper web 12, whereby the transfer belt 78 in FIG. 1 is directed towards the paper web 12. In the directed-towards state, the transfer belt 78 contacts the surface of the paper web 12 on its front side, whereby a toner image located on-the transfer belt 78 is transferred from the transfer belt 78 onto the front side of the paper web 12. The direction of the transfer belt 78 towards the paper web 12 is also designated as pivoting-towards, and the direction of the transfer belt 78 away from the paper web 12 is also designated as pivoting-away.

As already mentioned, the printing unit 18 is essentially structurally identical with the printing unit 16, whereby a transfer unit 86 is arranged on the belt drive 76 of the printing, unit 16 for transfer of the toner image located on the transfer belt 78. The transfer belts of the printing unit 16 and the printing unit 18 are essentially simultaneously pivoted towards the paper web 12, whereby a contact pressure is generated between two opposite rollers of the belt drives of the transfer belts.

The toner image on the transfer belt 78 is transferred with the aid of a transfer unit 79 that is designed as a corotron arrangement. Via the transfer of the toner image onto the transfer belt 78, the toner particles of the toner images of the front and back side have differing charges, such that the transfer of the toner images onto the paper web 12 is enabled via the attraction forces between the oppositely-charged toner particles through the paper web 12. Arrangements for designs of the transfer printing location or of the transfer printing region 84 are known from the U.S. Pat. No. 6,556,804 and the parallel European patent application 1 465 023 A1. The specification of the various designs of the transfer printing location between a transfer belt and a carrier material as well as between two transfer belts and a carrier material are herewith incorporated by reference into the present specification.

A roller device for directing the transfer belt 78 towards the paper web 12 and moving the transfer belt 78 away from the paper web 12 is described in detail in WO 00/54266, whose content is herewith incorporated by reference into the present specification. The transfer belt 78 of the belt drive 76 is driven by the drive roller 86. The character generator 72 generates a charge image on the charged photoconductor belt 68. The developer station 74 inks the photoconductor belt 68 with toner material corresponding to the charge image and thus generates a toner image corresponding to the charge image. The toner image is transfer-printed from the photoconductor belt 68 onto the transfer belt 78 at the first transfer printing location 80. The toner image is transfer-printed onto the paper web 12 at the second transfer printing location 84.

The fixing station 30 comprises a first fixing unit 54 and a second fixing unit 56 that are arranged on the opposite sides of the paper web 12, whereby the first fixing unit 54 fixes the front side and the second fixing unit 56 fixes the toner images on the back side of the paper web 12. The fixing units 54, 56 are designed as radiation fixing units, whereby the fixing units 54, 56 respectively comprise a sealing unit 58, 60 that covers the heat radiator of the fixing units 54, 56 during operating states in which no fixing of the print images on the paper web 12 should occur. Cooling elements 62, 64 are provided after the fixing units 54, 56 (as viewed in the transport direction of the paper web 12), which cooling elements 62, 64 cool the paper web 12 before the exit from the fixing station 30 in order to prevent a damaging of the paper web 12, in particular as a consequence of too-low paper moisture.

In the paper run direction of the paper web 12, a first exhaust channel 80 is also provided before the fixing unit 54 and a second exhaust channel 80 is provided after the fixing unit 54. An exhaust channel 84 is also provided before the lower-fixing unit 56 and an exhaust channel 86 is provided after this fixing unit 56. The exhaust channels 80 through 86 respectively have an opening running essentially perpendicular to the paper web 12 and facing towards the paper web 12, via which opening at least a part of the air heated with the aid of the fixing units 54 and 56 in the fixing process is discharged from the fixing station 30.

The exhaust channels 80 through 84 are connected with a cooling unit 90 via connection channels 92, 94 via which the hot air discharged from the fixing station 30 is supplied to the cooling unit 90. This discharged hot air is also designated as exhaust air in the following. The cooling unit 90 comprises a refrigerator (not shown) whose design is subsequently explained in further detail in connection with FIGS. 2 and 3.

The refrigerator uses the exhaust air discharged from the fixing station 30 as an energy source for operation of the refrigerator. Depending on the width of the paper web 12, the transport speed of the paper web 12 (which transport speed is dependent on the operating mode) and on the paper type, a fixing power in the range between 5 and 25 KW is preset. A majority of this heat quantity emitted by the fixing units 54 and 56 as radiant heat is transported as exhaust air to the cooling unit 90 via the exhaust channels 80 through 86 via the connection channels 92, 94. A negative pressure generation unit with whose aid the exhaust air is suctioned from the fixing station is advantageously provided in the cooling unit 90. Exhaust air of the fixing station 30 that is supplied to the refrigerator of the cooling unit 90 has a temperature in the range between 60° C. and 180° C. With the aid of a cold air channel 96, the cold air generated with the aid of the cooling unit 90 is directed inside the printing group 14, whereby the components located there (in particular the developer stations 74, the character generators 72 and photoconductor belts 68) are cooled. At least one channel for distribution of the cold air in the printing group 14 is advantageously provided in the printer, the printing group 14 having a plurality of connection nozzles via which cold air is specifically supplied to individual components 68, 60, 72, 74. Alternatively or additionally, a heat exchange system can be provided in the cooling unit 90, with which heat exchange system cooling water is cooled that is then supplied to the cooling units 62, 64 and/or to individual components or structural groups of the print head. The waste heat of the refrigerator is discharged from the cooling unit 90 with the aid of an exhaust channel 98. Alternatively or additionally, this waste heat can be fed to a remotely-arranged heat exchanger with the aid of a fluid cooling.

Figure 2:
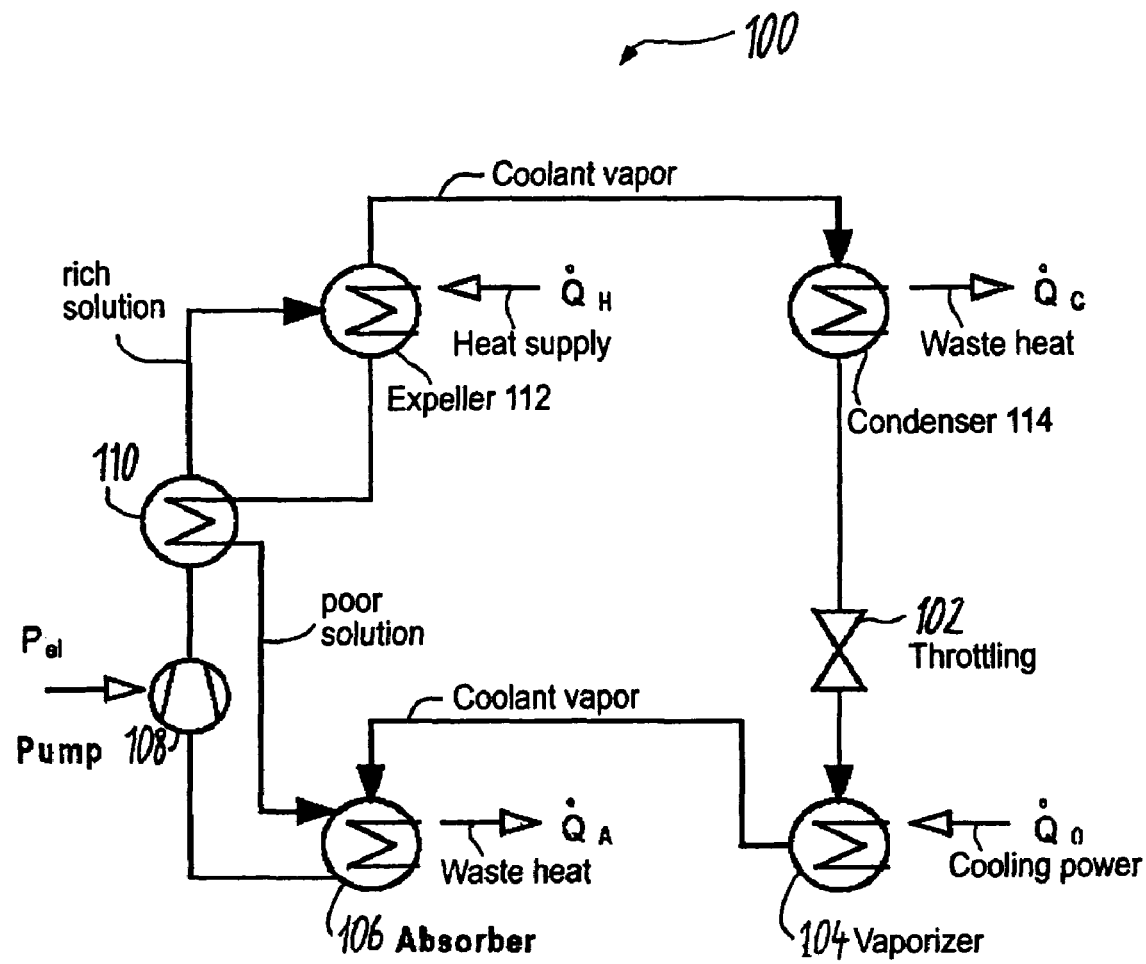
FIG. 2 is a schematic representation of the modules and of the loop or cycle process of an absorption refrigerator.

Structural groups of an absorption refrigerator 100 as well as the material cycle of the absorption refrigerator 100 are schematically shown in FIG. 2. The coolant liquefied with the aid of a condenser 114 is vaporized in a vaporizer 104, whereby a valve 102 between the condenser 114 and the vaporizer 104 serves for throttling of the flow of liquefied coolant. The heat flow is thereby extracted from the cooling air to be cooled, whereby this heat flow corresponds with the cooling capacity generated with the aid of the absorption refrigerator 100. As already mentioned in connection with FIG. 1, the medium cooled with the aid of the vaporizer 104 can also be a fluid (in particular coolant water) or another gas such as, for example, $CO_2$. The vaporizer 104 can also be directly arranged at the point of the printer 10 at which the cooling capacity is required. The cooling elements 62 and 64 can in particular be respectively designed as vaporizers 104.

The vaporized coolant, i.e. the coolant vapor, is subsequently supplied to an absorber 106 and absorbed by a second medium. The absorption heat thereby occurring is emitted by the absorber 106 as a waste heat flow. The waste heat is emitted to the outside via an exhaust channel 98 of the cooling unit 90. This exhaust is advantageously conducted out from the building in which the printer 10 is installed.

The second medium enriched with coolant vapor in the absorber 106 is pumped to a higher pressure level with the aid of the pump 108 and supplied to an expeller 112. In the expeller 112, the heating energy necessary for operation of the refrigerator is supplied with the aid of the hot air supplied from the fixing station 30. Coolant vapor is thereby expelled from the second medium (rich solution) enriched with the coolant vapor. The expelled coolant vapor is supplied from the expeller 112 to the condenser 114 for liquefaction. The medium remaining behind in the expeller 112 is directed back to the absorber 106 via a heat exchanger 110.

With the aid of the heat exchanger 110, a portion of the heat quantity supplied to the second medium in the expeller 112 is preheated at the mixture made up of second medium and coolant vapor that is transported to the expeller 112 with the aid of the pump 108. After at least a part of the coolant vapor has been released from the second medium with the aid of the expeller 112, the second medium can be directed back to the absorber 106 and there absorb further coolant vapor.

The second medium with a lower proportion of coolant vapor is also designated as a poor solution. The coolant vapor expelled with the aid of the expeller 112 is condensed in the condenser 114 under discharge of the heat flow. As already explained, the liquefied coolant is subsequently released [chilled] to emit the cooling capacity. The heat quantity flow emitted by the condenser 114 is likewise conducted outside of the room in which the printer is installed. The absorber and/or the condenser are advantageously installed outside of the room or outside of the building in which the printer is located. Alternatively, the exhausted heat quantity from the absorber and/or condenser can be at least partially and/or intermittently used for pre-heating of the recording medium 12 between printing group 14 and fixing station 30.

Figure 3:
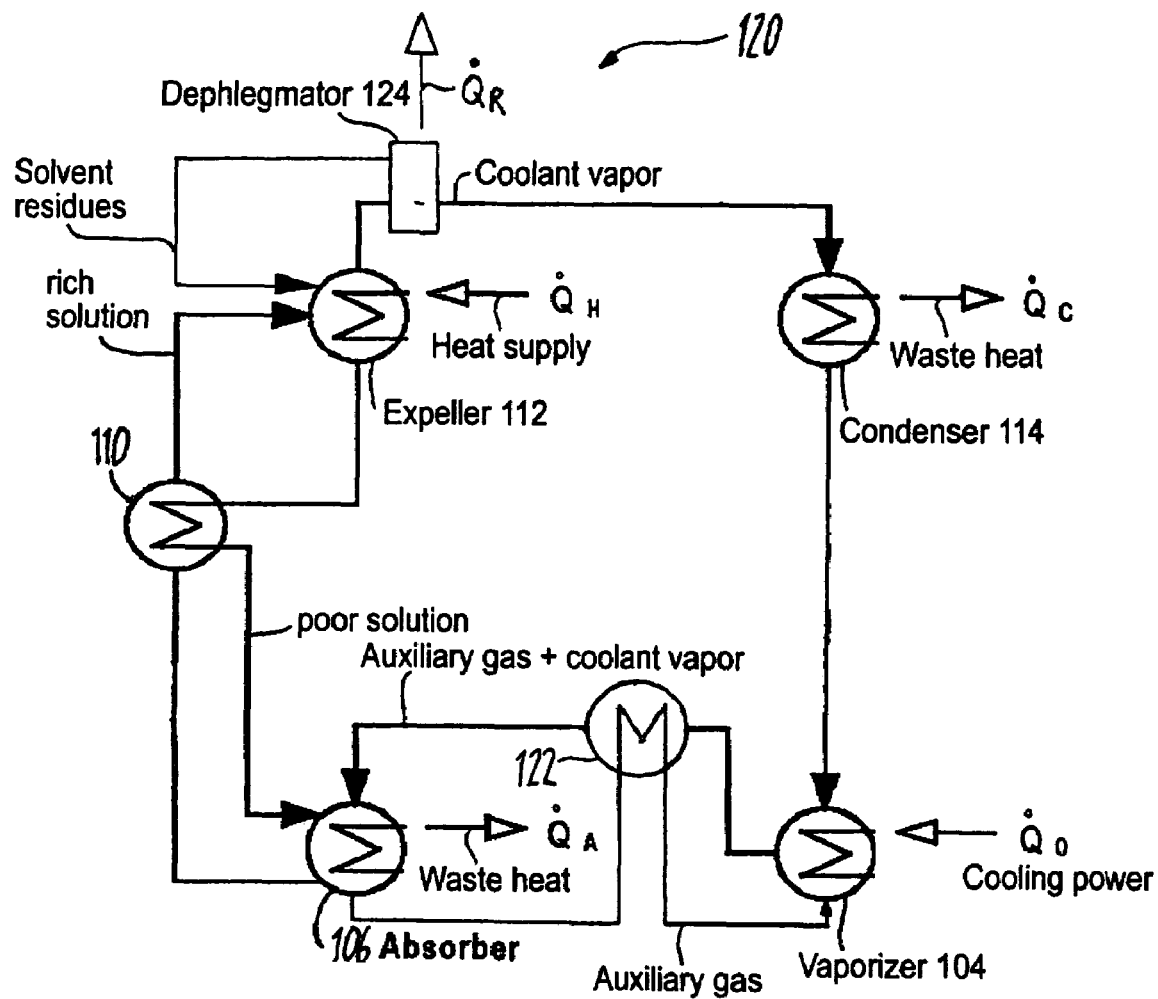
FIG. 3 is a schematic representation of the modules and of the cycle process of a diffusion-absorption refrigerator.

A schematic representation of the structural group of a diffusion-absorption refrigerator 120 is shown in FIG. 3. The diffusion-absorption refrigerator 120 has a design similar to the absorption refrigerator 100 according to FIG. 2. Identical elements have identical reference characters. In contrast to the absorption refrigerator according to FIG. 2, the diffusion-absorption refrigerator according to FIG. 3 has an auxiliary gas loop with an indifferent auxiliary gas between the vaporizer 104 and the absorber 106 as well as a heat exchanger 122. The auxiliary gas of the auxiliary gas loop is enriched with coolant vapor in the vaporizer 104. The mixture of auxiliary gas and coolant vapor is subsequently supplied to the absorber 106. The heat exchanger emits a portion of the heat of the auxiliary gas supplied back from the absorber 106 to the vaporizer 104, which heat is emitted to the auxiliary gas enriched with coolant vapor in the vaporizer 104.

For example, helium or hydrogen can be used as an indifferent auxiliary gas. This auxiliary gas circulates between the vaporizer 104 and the absorber 106 due to temperature and density differences. The auxiliary gas effects a compensation of the pressure that is built up in the expeller 112 with the aid of what is known as a thermal vapor bubble pump. Due to external head supply of the heat flow, the expelled coolant vapor rises bubble-like in a tube bundle of a heat exchanger of the expeller 112 and carries the still-rich solution with it. The reflux of the resulting poor solution in the absorber 106 occurs due to the effect of the fluid column building up in the expeller 112, which fluid column is higher than the fluid column in the absorber 106 (connected via a reflux line).

The auxiliary gas loop between the vaporizer 104 and the absorber 106 also reduces the effect of the pressure difference that results in the coolant loop due to the different partial pressures of the coolant between the expeller. 112 and the condenser 114 on the one hand and the vaporizer 104 and the absorber 106 on the other hand. The coolant itself arrives back again at the vaporizer 104 via the condenser 114 (acting as a liquefier) due to the differences in the specific weight of the phase states.

The diffusion-absorption refrigerator 120 shown in FIG. 3 therefore requires no mechanically-actuated elements or throttles, such that no further energy is required for operation of the refrigerator 120 outside of the heat flow.

The diffusion-absorption refrigerator 120 according to FIG. 3 also has a dephlegmator 124 that removes residues of the second medium from the coolant vapor and directs them back to the expeller 112. The dephlegmator thus extracts the second medium that is still present in the coolant vapor that leaves the expeller 112. The dephlegmator emits a rectification heat flow that is discharged like the heat flows and $\dot{Q}_c$ and $\dot{Q}_A$ Forced ventilation can additionally be used to discharge the waste heat of the condenser 114, the absorber 106 and/or the dephlegmator. A negative pressure can also be generated in the exhaust channels 80 through 84 with the aid of a suitable blower to cool the exhaust air from the fixing station 30. A filter can additionally be provided that filters the warm air supplied to the cooling unit 90 and/or the cold air generated by the cooling unit 90. Due to the provision of cooling unit 90 of the preferred embodiment, a closed (sealed) gas loop (for example with $CO_2$ gas) can also be provided in the printer or copier via which in particular the fire hazard in the printer 10 is reduced. A printer 10 for printing of a paper web 12 is shown in FIG. 1. The preferred embodiment is naturally also possible for printers for printing of single sheets and other carrier material types.

As already mentioned in the specification preamble, in printers or copiers the necessity frequently exists to cool components or parts of aggregates in order to not exceed a preset temperature. This is in particular necessary in order to be able to reliably control the electrophotography process in electrophotographic printers or copiers. If, for example, the light capacities of the character generator are temperature-dependent, the sensitivity of the photoconductor, the toner particle activation, the transport of the toner particles and of the toner particle/carrier mixture as well as the mechanical stability of the toner particles are temperature-dependent. The temperature of the carrier material provided with a toner image is also decisive for the heat quantity necessary to fix the toner image on the carrier material. If a reliable temperature range is under-run or exceeded, this in particular leads to a poor fixing and thereby to an increased toner abrasion of the fixed print image, to an adhesion of the print images, to what is known as curling, as well as to problems in the post-processing of the printed carrier material.

In known printers or copiers, individual components or structural groups are, for example, cooled by forced convection with the aid of blowers and by natural convection via the provision of cooling fins. Cooling aggregates with a liquid closed loop are also conceivable. However, problems also occur given convention, to the effect that the waste heat of the one structural group is fed to another structural group and there can lead to further problems. A targeted or specific feed of cold air and a targeted or specific exhaust of warm air occurs to or from the individual structural groups, for example via coolant air channels and exhaust channels that are provided in the printer 10. As an alternative to the supply of cold air, a closed liquid loop can also be provided for discharging of heat from individual components.

The cooling power necessary for cooling the printer 10 is at least centrally acquired from the waste heat flow of the fixing station 30 for a portion of the components and structural groups to be cooled. The considerable energy flow of the fixing station 30 is thus utilized, which energy flow was, in the prior art, discharged directly to the surroundings of the printer or directed to the out-of-doors via an exhaust system in a relatively complicated manner and there decontaminated. This energy flow also directly accumulates in the printing operation when the maximal cooling capacity is also required. The plurality of individual cooling systems in the printer 10 can be omitted, whereby the energy balance of the printer 10 significantly improves. The components for the individual cooling solutions of individual components and structural groups are at least partially superfluous. The waste heat of the control units for activation of the decentralized cooling units and the waste heat of these cooling units themselves is then also no longer present. Possible disruptions of other components and structural groups, in particular electrical disturbances due to power-conditional currents and/or frequencies, are also avoided via the omission of the decentralized cooling units. These cooling units also do not have to be linked into a central error monitoring and into a central controller. The reliability of the printer 10 can be increased and the failure rate reduced via the omission of this plurality of cooling units.

One-stage absorption refrigeration systems 100, 120 are shown and described in FIGS. 2 and 3. These absorption refrigeration systems 100, 120 can be purely thermally driven given an exhaust temperature of 80° C. to 100° C. and reach an energy equivalent of 60% to 80% of the used heat energy as cold. However, two-stage systems can alternatively also be provided that operate with a higher efficiency. A heat flow of 140° C. to 160° C. is necessary for these two-stage systems. A water/lithium bromide solution or a water/ammonium solution is used as a medium for the absorption refrigerators 100, 120 shown in FIGS. 2 and 3. Given a waste heat power of the fixing station 30 of approximately 20 kW in the printing operation for printing of a standard print quality 12 with 80 g/m², more than 10 kW of cooling capacity can thus be realized. In particular the paper cooling after the fixing units 56, 58 by the cooling elements 62 and 64 can thereby be realized, and a sufficiently large amount of energy is also available to the developer stations.

Instead of a fluid sorption medium, a dry sorption medium can also be used such as, for example, hygroscopic silicate gel or ammonia salt in connection with water vapor. However, given these sorption media regeneration phases are necessary, whereby two reactors in alternating operation must be used in order to be able to enable a quasi-continuous operation. With regard to this quasi-continuous operation, further auxiliary aggregates must be provided. Such a refrigerator with dry or solid sorption media is designated as an adsorption refrigerator. An adsorption refrigerator has a degree of efficiency of 55% to 65%, whereby a minimal heat temperature of 60° C. is necessary. Given both fluid and solid sorption media, it is advantageous to use auxiliary actuators such as the pump 108 to transport the refrigeration and sorption media in order to securely produce the necessary process pressures. Typical auxiliary actuators require approximately 1% of the utilized thermal energy, whereby the required powers for these auxiliary actuators are of ancillary importance for the total energy balance of the absorption refrigerator 100, 120. As already mentioned, what is known as a bubble pump that requires no additional auxiliary energy can also be used, in particular given the diffusion-absorption refrigerator for conveyance (i.e. for transport) of the refrigerant/absorption means.

As an alternative to the absorption refrigerators 100, 120, a duplex Stirling machine can also be driven with the aid of the waste heat flow. The duplex Stirling machine has a Stirling motor that drives a Stirling refrigerator for generation of cold. Given a temperature of the heat flow from the fixing station 30 with approximately 100° C., the theoretical degree of efficiency of the motor lies at approximately 30%, such that given a degree of efficiency of the Stirling refrigerator of approximately 50%, a refrigerating power of 3 kW would still result given a heat flow of 20 kW. However, in practical usage of the Stirling motors it has been shown that presently the actual achievable degree of efficiency of the Stirling motor is less, such that only a refrigerating power of approximately 1 kW could be generated. However, given an improvement of the efficiency of the Stirling motors, such a duplex Stirling machine can also be used for generation of cold in a printer 10 or copier.

A Vuilleumier refrigerator can also be used as an alternative to the previously-described refrigerators. The thermal process of this Vuilleumier refrigerator resembles that of the duplex Stirling machine, whereby the coupling of Stirling drive and cold generation does not occur mechanically but rather thermodynamically via coupled gas currents. No satisfactory degree of efficiency has yet been achieved for a reasonable utilization of this Vuilleumier, refrigerator in a printer 10 or copier. Given an improvement of its degree of efficiency, however, the Vuilleumier refrigerators can also reasonably be used in a printer or copier.

Although a preferred exemplary embodiment with variations has been shown and described in detail in the drawings and in the preceding specification, these here should merely be viewed as purely exemplary and not as limiting the invention. It is noted that only the preferred exemplary embodiment with variations are shown and described, and all changes and modifications that presently and in the future lie within the protective scope of the invention should be protected.

I claim as my invention:

1. A printer or copier, comprising:
   at least one printing unit that generates at least one toner image on at least one page of a carrier material;
   at least one fixing unit that fixes the toner image on the carrier material with aid of heat generated by the fixing unit;
   a refrigerator which generates cold and to which is supplied at least a part of the heat generated in the fixing unit; and
   the refrigerator using at least a part of the supplied heat from the fixing unit for generation of the cold.

2. A printer or copier according to claim 1 wherein at least a part of the supplied heat energy serves as an energy source for the refrigerator.

3. A printer or copier according to claim 1 wherein the heat is supplied to at least one expeller of an absorption refrigerator or of a diffusion-absorption refrigerator.

4. A printer or copier according to claim 1 wherein a gas bubble pump is driven with aid of the heat, the gas bubble pump driving a closed fluid loop or a closed gas loop of the refrigerator.

5. A printer or copier according to claim 1 wherein a system is provided that discharges at least a part of the heat generated to fix the toner image from the fixing unit and supplies it to the refrigerator.

6. A printer or copier according to claim 1 wherein a warm exhaust is discharged from the fixing unit.

7. A printer or copier according to claim 1 wherein a vaporizer of the refrigerator emits the cold.

8. A printer or copier according to claim 1 wherein a heat exchanger arrangement is provided that cools a gas with the generated cold, at least one component of the printer or copier being cooled with aid of the cooled gas.

9. A printer or copier according to claim 8 wherein the cooled gas is supplied to a substantially closed inner chamber of the printer or copier.

10. A printer or copier according to claim 8 wherein a distributor system which distributes the cooled gas is provided that supplies the cooled gas to a plurality of components or structural groups of the printer or copier.

11. A printer or copier according to claim 8 wherein a cooled air channel with at least one exit opening for exit of at least a part of the cooled gas is provided, the gas exiting from the exit opening being fed to a component to be cooled of the printer or copier.

12. A printer or copier according to claim 1 wherein a heat exchanger system is provided that cools a fluid with the generated cold, at least one component of the printer or copier being cooled with aid of the cooled fluid.

13. A printer or copier according to claim 12 wherein an arrangement for distribution of the cooled fluid is provided that supplies the cooled fluid to a plurality of components or structural groups of the printer or copier.

14. A printer or copier according to claim 12 wherein an open or a closed cooling loop is provided.

15. A printer or copier according to claim 1 wherein an environment of the printer or copier is cooled with aid of the generated cold.

16. A printer or copier according to claim 1 wherein the refrigerator comprises a one-stage refrigerator.

17. A printer or copier of claim 1 wherein the cold is supplied to the carrier material with the toner image to cool the carrier material after it leaves the fixing unit.

18. A printer or copier, comprising:
at least one printing unit that generates at least one toner image on at least one page of a carrier material;
at least one fixing unit that fixes the toner image on the carrier material with aid of heat generated by the fixing unit;
a refrigerator which generates cold and to which is supplied at least a part of the heat generated in the fixing unit;
the refrigerator using at least a part of the supplied heat from the fixing unit for generation of the cold; and
a heat flow with a power in a range of 2 kW to 35 kW being supplied to the refrigerator.

19. A method for generation of cold with a printer or copier, comprising the steps of:
supplying to a refrigerator at least a part of a heat generated with a fixing unit which fixes at least one toner image on a carrier material; and
generating cold by the refrigerator with at least a part of the supplied heat from the fixing unit.

20. A method of claim 19 including the further step of utilizing cold from the refrigerator to cool the carrier material after a heating by said fixing unit.

21. A method of claim 19 including the step of utilizing said cold from said refrigerator to cool at least one component of the printer or copier.

22. A refrigerator for generation of cold in a printer or copier, comprising:
a refrigerator unit which receives and utilizes a waste heat flow of a fixing unit of the printer or copier to generate cold.

23. A refrigerator of claim 22 wherein the refrigerator comprises an absorption refrigerator.

24. A refrigerator for generation of cold in a printer or copier, comprising:
a refrigerator unit which receives and utilizes a waste heat flow of a fixing unit of the printer or copier to generate cold; and
the refrigerator unit being a diffusion-absorption refrigerator unit.

25. A refrigerator for generation of cold in a printer or copier, comprising:
a refrigerator unit which receives and utilizes a waste heat flow of a fixing unit of the printer or copier to generate cold; and
the refrigerator unit being a Stirling refrigerator unit with a Stirling motor drive.

26. A refrigerator for generation of cold in a printer or copier, comprising:
a refrigerator unit which receives and utilizes a waste heat flow of a fixing unit of the printer or copier to generate cold; and
the refrigerator unit being a Vuilleumier refrigerator unit.

27. A method for generation of cold with a printer or copier, comprising the steps of:
supplying to a refrigerator at least a part of a heat generated with a fixing unit of the printer or copier which fixes at least one toner image on a carrier material;
generating cold by the refrigerator with at least a part of the supplied heat from the fixing unit; and
utilizing the generated cold to cool said carrier material after said carrier material has been heated by said fixing unit, and also using said generated cold to cool at least one component of the printer or copier.

* * * * *